United States Patent
Jayaramachar et al.

(10) Patent No.: US 11,825,370 B2
(45) Date of Patent: Nov. 21, 2023

(54) METHODS, SYSTEMS, AND COMPUTER READABLE MEDIA FOR PROVIDING FOR NETWORK FUNCTION (NF) FALLBACK TO RECOVERED NF REPOSITORY FUNCTION (NRF)

(71) Applicant: Oracle International Corporation, Redwood Shores, CA (US)

(72) Inventors: Amarnath Jayaramachar, Bangalore (IN); Jay Rajput, Bangalore (IN); Virendra Singh, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 221 days.

(21) Appl. No.: 17/386,649

(22) Filed: Jul. 28, 2021

(65) Prior Publication Data
US 2023/0032054 A1    Feb. 2, 2023

(51) Int. Cl.
*H04W 36/10* (2009.01)
*H04W 36/12* (2009.01)
*H04W 36/16* (2009.01)

(52) U.S. Cl.
CPC ........... *H04W 36/12* (2013.01); *H04W 36/16* (2013.01)

(58) Field of Classification Search
USPC ........................................................ 370/331
See application file for complete search history.

(56) References Cited

U.S. PATENT DOCUMENTS

| | | | |
|---|---|---|---|
| 11,012,058 B2* | 5/2021 | Dubey | ..................... H04R 3/00 |
| 11,265,694 B2 | 3/2022 | Farooq | |
| 11,611,626 B1 | 3/2023 | Srivastava et al. | |
| 2017/0303259 A1 | 10/2017 | Lee et al. | |
| 2019/0124572 A1* | 4/2019 | Park | ..................... H04W 36/08 |
| 2020/0136715 A1* | 4/2020 | Venugopal | ........ H04W 72/0453 |
| 2020/0396132 A1 | 12/2020 | Wang et al. | |

(Continued)

FOREIGN PATENT DOCUMENTS

WO   WO 2020/202043 A1   10/2020
WO   WO 2022/251324 A1   12/2022

OTHER PUBLICATIONS

US 11,483,406 B1, 10/2022, Srivastava et al. (withdrawn)
(Continued)

*Primary Examiner* — Gregory B Sefcheck
*Assistant Examiner* — Majid Esmaeilian
(74) *Attorney, Agent, or Firm* — Jenkins, Taylor & Hunt, P.A.

(57) ABSTRACT

A method for providing for network function (NF) fallback to a recovered network function NF repository function (NRF) includes, at an NF including at least one processor, generating an NF register message including an indication to notify the NF of recovery of a first NRF after a failure of the first NRF. The method further includes transmitting the NF register message to the first NRF. The method further includes communicating with the first NRF and detecting failure of the first NRF. The method further includes, in response to detecting failure of the first NRF, initiating communications with a second NRF that is a geo-redundant mate of the first NRF. The method further includes receiving notification of recovery of the first NRF and falling back to communicating with the first NRF.

20 Claims, 12 Drawing Sheets

(56) References Cited

U.S. PATENT DOCUMENTS

| | | | |
|---|---|---|---|
| 2021/0058833 A1* | 2/2021 | Basu Mallick ... | H04W 36/0055 |
| 2021/0111985 A1 | 4/2021 | Mahalank et al. | |
| 2023/0007536 A1* | 1/2023 | Sharma ............ | H04W 28/0842 |
| 2023/0102122 A1 | 3/2023 | Krishan | |
| 2023/0232322 A1 | 7/2023 | Singh et al. | |

OTHER PUBLICATIONS

ETSI TS 129 510 V16.5.0 (Jan. 2021), "5G; 5G System; Network function repository services" published by 3GPP (Year: 2021).*

Commonly-assigned, co-pending U.S. Appl. No. 17/488,793 for "Methods, Systems, and Computer Readable Media for Identifying Alternate Delivery Endpoints for Mobile Originated Data and Monitoring Reports in a Communications Network" (Sep. 29, 2021).

"3rd Generation Partnership Project; Technical Specification Group Core Network and Terminals; 5G System; Network Exposure (NE) function services for Non-IP Data Delivery (NIDD); Stage 3 (Release 17)," 3GPP TS 29.541, V17.1.0, pp. 1-40 (Sep. 2021).

Commonly-assigned, co-pending U.S. Appl. No. 17/334,268 for "Methods, Systems, and Computer Readable Media for Distributing Network Function (NF) High Availability (HA) Topology Information in a Core Network" (Unpublished, filed May 28, 2021).

Notice of Allowance for U.S. Appl. No. 17/334,268 (dated Jun. 6, 2022).

Applicant-Initiated Interview Summary for U.S. Appl. No. 17/334,268 (dated May 5, 2022).

"5G; System architecture for the 5G System (5GS) (3GPP TS 23.501 version 16.6.0 Release 16)," ETSI TS 123 501, V16.6.0, pp. 1-449 (Oct. 2020).

"5G; 5G System; Network function repository services; Stage 3 (3GPP TS 29.510 version 16.4.0 Release 16)," ETSI TS 129 510, V16.4.0, pp. 1-208 (Jul. 2020).

VMWare, "Configure Security VNF with HA", pp. 1-4 (Sep. 21, 2020).

Non-Final Office Action for U.S. Appl. No. 17/334,268 (dated Mar. 28, 2022).

Commonly-assigned, co-pending U.S. Appl. No. 17/578,300 for "Methods, Systems, and Computer Readable Media for Prioritizing Among Alternate Network Function (NF) Instances" (Jan. 18, 2022).

"3rd Generation Partnership Project; Technical Specification Group Core Network and Terminals; Numbering, addressing and identification; (Release 17)," 3GPP TS 23.003, V17.3.0, pp. 1-145 (Sep. 2021).

"3rd Generation Partnership Project; Technical Specification Group Core Network and Terminals; 5G System; Principles and Guidelines for Services Definition; Stage 3 (Release 17)," 3GPP TS 29.501, V17.3.1 pp. 1-78 (Sep. 2021).

"3rd Generation Partnership Project; Technical Specification Group Core Network and Terminals; 5G System; Technical Realization of Service Based Architecture; Stage 3 (Release 17)," 3GPP 29.500, V17.4.0, pp. 1-109 (Sep. 2021).

"3rd Generation Partnership Project; Technical Specification Group Services and System Aspects; Procedures for the 5G System (5GS); Stage 2 (Release 17)," 3GPP TS 23.502, V17.2.1, pp. 1-712 (Sep. 2021).

"3rd Generation Partnership Project; Technical Specification Group Services and Systems Aspects; System architecture for the 5G System (5GS); Stage 2 (Release 17)," 3GPP TS 23.501, V17.2.0 pp. 1-542 (Sep. 2021).

"3rd Generation Partnership Project; Technical Specification Group Core Network and Terminals; 5G System; Network Function Repository Services; Stage 3 (Release 17)," 3GPP TS 29.510, V17.3.0, pp. 1-271 (Sep. 2021).

Notice of Allowance and Fee(s) Due for U.S. Appl. No. 17/334,268 (dated Nov. 9, 2022).

Notification of Transmittal of the International Search Report and the Written Opinion of the International Searching Authority, or the Declaration for International Application No. PCT/US2022/030874 (dated Sep. 1, 2022).

"3rd Generation Partnership Project; Technical Specification Group Services and System Aspects; Study on enablers for network automation for the 5G System (5GS); Phase 2 (Release 17)," 3GPP TR 23.700-91, V17.0.0, pp. 1-382 (Dec. 2020).

"3rd Generation Partnership Project; Technical Specification Group Services and System Aspects; Procedures for the 5G System (5GS); Stage 2 (Release 17)," 3GPP TS 23.502, V17.0.0, pp. 1-646 (Mar. 2021).

"3rd Generation Partnership Project; Technical Specification Group Core Network and Terminals; 5G System; Technical Realization of Service Based Architecture; Stage 3 (Release 17)," 3GPP TS 29.500, V17.2.0, pp. 1-100 (Mar. 2021).

"3rd Generation Partnership Project; Technical Specification Group Services and System Aspects; System architecture for the 5G System (5GS); Stage 2 (Release 17)," 3GPP TS 23.501, V17.0.0, pp. 1-489 (Mar. 2021).

"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).

\* cited by examiner

METHODS, SYSTEMS, AND COMPUTER READABLE MEDIA FOR PROVIDING FOR NETWORK FUNCTION (NF) FALLBACK TO RECOVERED NF REPOSITORY FUNCTION (NRF)

TECHNICAL FIELD

The subject matter described herein relates to providing for access to NRF services in a communications network. More particularly, the subject matter described herein relates to methods, systems, and computer readable media for providing for an NF service consumer or producer to fall back to a recovered NRF.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can obtain information about producer NF instances that have registered with the NRF through the NF service discovery procedure. According to the NF service discovery procedure, a consumer NF sends an NF discovery request to the NRF. The NF discovery request includes query parameters that the NRF uses to locate NF profiles of producer NFs capable of providing the service identified by the query parameters. NF profiles are data structures that define the type of service provided by a producer NF instance and well as load and overload control information regarding the producer NF instance.

In addition to consumer NFs, another type of network node that can invoke the NF service discovery procedure to obtain information about NF service instances is a service communication proxy (SCP). The case where the SCP uses the NF service discovery procedure to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances. The communications model where consumer NFs communicate with producer NFs via the SCP is referred to as the indirect communications model.

In addition to the SCP, another example of an intermediate proxy node that routes traffic between producer and consumer NFs is the security edge protection proxy (SEPP). The SEPP is the network node used to protect control plane traffic that is exchanged between different 5G public land mobile networks (PLMNs). As such, the SEPP performs message filtering, policing and topology hiding for all application programming interface (API) messages that are transmitted between PLMNs.

One problem in 5G communications networks can occur when NRFs are deployed as geo-redundant mates in an NF set. In such a network deployment, an NF may initially communicate with the highest priority available NRF in the NF set. If that NRF fails, the NF may begin communicating with the next highest priority available NRF in the NF set. If the first NRF recovers, there is currently no mechanism to notify the NF of the recovery or for the NF to fall back to communicating with the first NRF, and continuing to use the services of the next highest priority NRF may be inefficient for latency purposes.

Accordingly, in light of these and other difficulties, there exists a need for a mechanism for an NF consumer or producer to fall back to communicating with a recovered NRF.

SUMMARY

A method for providing for network function (NF) fallback to a recovered network function NF repository function (NRF) includes, at an NF including at least one processor, generating an NF register message including an indication to notify the NF of recovery of a first NRF after a failure of the first NRF. The method further includes transmitting the NF register message to the first NRF. The method further includes communicating with the first NRF and detecting failure of the first NRF. The method further includes, in response to detecting failure of the first NRF, initiating communications with a second NRF that is a geo-redundant mate of the first NRF.

According to another aspect of the subject matter described herein, the indication to notify the NF of recovery of the first NRF after failure of the first NRF includes a notify-on-recovery header populated with a parameter associated with the NF.

According to another aspect of the subject matter described herein, the parameter associated with the NF comprises a uniform resource identifier (URI) associated with the NF.

According to another aspect of the subject matter described herein, the indication to notify the NF of recovery of the first NRF after failure of the first NRF includes a notify-on-recovery information element (IE) populated with a parameter associated with the NF.

According to another aspect of the subject matter described herein, the method for providing for NF fallback to a recovered NRF comprises maintaining a database including records corresponding to the first NRF and geo-redundant mates of the first NRF, where the records indicate relative priorities of the first NRF and the geo-redundant mates of the first NRF.

According to another aspect of the subject matter described herein, the method for providing for NF fallback to a recovered NRF comprises, prior to initiating the communications with the second NRF, selecting the second NRF from the database based on a priority of the second NRF.

According to another aspect of the subject matter described herein, receiving notification of recovery of the first NRF includes receiving a NOTIFY message with an NF status parameter indicating recovery of the first NRF.

According to another aspect of the subject matter described herein, falling back to communicating with the first NRF includes initiating at least one NRF NF management service operation with the first NRF.

According to another aspect of the subject matter described herein, the NF comprises a consumer NF or a producer NF.

According to another aspect of the subject matter described herein, a method for providing for fallback to a recovered network function (NF) repository function (NRF) is provided. The method includes steps performed at an NRF including at least one processor. The steps include receiving, from an NF, an NF register message including an indication to notify the NF of recovery of the NRF after a failure of the NRF and storing the indication in an NF registration record for the NF. The steps further include in response to recovery of the NRF after a failure of the NRF, accessing the NF registration record for the NF, reading the indication to notify the NF, and generating, and sending a notification message to the NF indicating recovery of the NRF. The steps further include providing NRF NF management service to the NF in response to an NRF NF management service request from the NF.

According to another aspect of the subject matter described herein, a system for providing for network function (NF) fallback to a recovered network function NF repository function (NRF) is provided. The system includes an NF including at least one processor. The system further includes an NF registration handler implemented by the at least one processor for generating an NF register message including an indication to notify the NF of recovery of a first NRF after a failure of the first NRF and transmitting the NF register message to the first NRF. The system further includes a post-registration service communications handler implemented by the at least one processor for communicating with the first NRF, detecting failure of the first NRF, in response to detecting failure of the first NRF, initiating communications with a second NRF that is a geo-redundant mate of the first NRF, receiving notification of recovery of the first NRF, and falling back to communicating with the first NRF.

According to another aspect of the subject matter described herein, the system for providing for NF fallback to a recovered NRF includes a database located at the NF and including records corresponding to the first NRF and geo-redundant mates of the first NRF, where the records indicate relative priorities of the first NRF and the geo-redundant mates of the first NRF.

According to another aspect of the subject matter described herein, the post-registration service communications handler is configured to, prior to initiating communications with the second NRF, select the second NRF from the database based on a priority of the second NRF.

According to another aspect of the subject matter described herein, the notification of recovery of the first NRF includes a NOTIFY message with an NF status parameters indicating recovery of the first NRF.

According to another aspect of the subject matter described herein, the post-registration service communications handler is configured to fall back to communicating with the first NRF by initiating at least one NRF NF management service operation with the first NRF.

According to another aspect of the subject matter described herein, a system for providing for fallback to a recovered network function (NF) repository function (NRF) is provided. The system includes an NRF including at least one processor and a memory. The system further includes an NF registration manager implemented by the at least one processor for receiving, from an NF, an NF register message including an indication to notify the NF of recovery of the NRF after a failure of the NRF and storing the indication in an NF registration record for the NF. The system further includes an NRF recovery manager implemented by the at least one processor for, in response to recovery of the NRF after a failure of the NRF accessing the NF registration record for the NF, reading the indication to notify the NF, and generating and sending a notification message to the NF indicating recovery of the NRF. The system further includes an NRF NF management service provider implemented by the at least one processor for providing NRF NF management service to the NF in response to an NRF NF management service request from the NF.

According to another aspect of the subject matter described herein, a non-transitory computer readable medium having stored thereon executable instructions that when executed by a processor of a computer control the computer to perform steps is provided. The steps are performed at an NF. The steps include generating an NF register message including an indication to notify the NF of recovery of a first NRF after a failure of the first NRF. The steps further include transmitting the NF register message to the first NRF. The steps further include communicating with the first NRF. The steps further include detecting failure of the first NRF. The steps further include, in response to detecting failure of the first NRF, initiating communications with a second NRF that is a geo-redundant mate of the first NRF. The steps further include receiving notification of recovery of the first NRF. The steps further include falling back to communicating with the first NRF.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
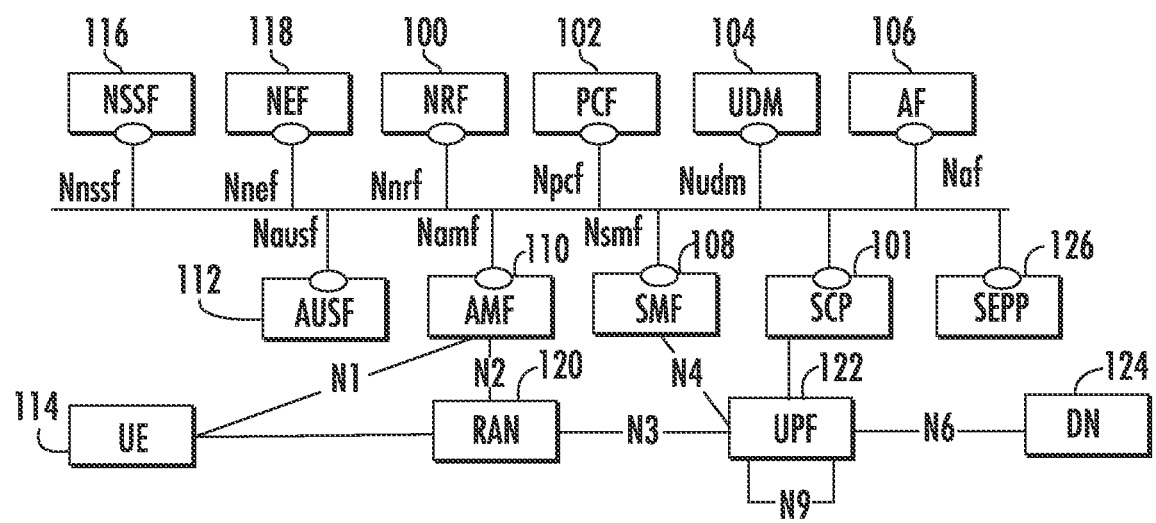
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in 3GPP TS 29.510. The NF or service profile definition includes at least one of a fully qualified domain name (FQDN), an Internet protocol (IP) version 4 (IPv4) address or an IP version 6 (IPv6) address.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (loT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

As stated above, one problem or shortcoming of existing 5G networks is the inability for an NF to fall back to communicating with an NRF that recovers from a failure. Communications between an NF and a mate of the recovered NRF may by sub-optimal because of increased latency for such communications over those experienced between the NF and the recovered NF. However, there is currently no mechanism defined in 3GPP standards for notifying an NF of recovery of an NRF or falling back to communications with the recovered NRF.

As indicated above, an NRF provides a variety of service operations to network functions in the 5G network. One such service operation is the NF register service operation. The NF register service operation is defined in Section 5.2.2.2 of 3GPP TS 29.510. The NF register service operation is used to register an NF with the NRF by providing the NF profile of the NF to the NRF, allowing the NF to be discovered by other NFs. The NF register service operation can also be used to register service is associated with an existing NF instance. The NF register service operation can further be used to register NRF information with another NRF, which can be used to forward discovery requests.

Figure 2:
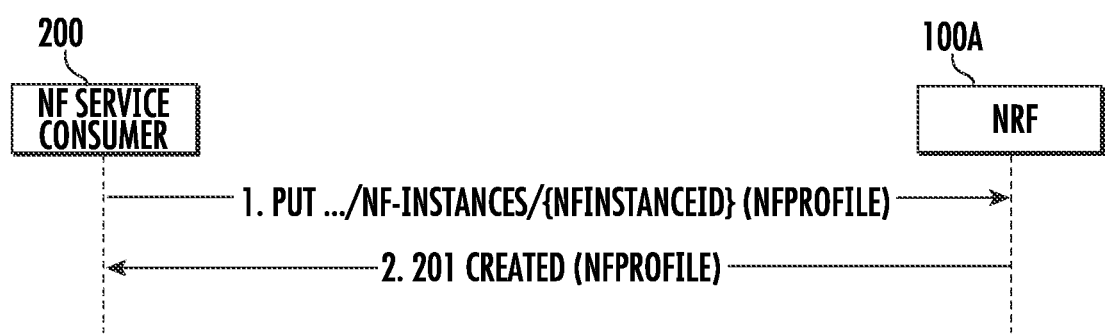
FIG. 2 is a message flow diagram illustrating exemplary messages exchanged for the NF register service operation.

FIG. 2 illustrates exemplary messages exchanged in the NF register service operation. Referring to FIG. 2, in step 1, NF service consumer 200 initiates the NF register service operation by sending and HTTP PUT message to NRF 108. NF service consumer 200 sends the HTTP PUT message to the highest priority (most preferred) available NRF that is locally configured to serve the consumer NF. In step 2 of the message flow diagram, NRF 100A responds to the HTTP PUT message with a 201 Created message, indicating that the registration was successful. As will be described in more detail below, if the highest priority NRF fails, the consumer NF seeks NF service from a lower priority NRF, and the highest priority NRF recovers, there is no mechanism for the consumer NF to fall back to obtaining service from the highest priority NRF.

Another service operation provided by the NRF is the NF heart-beat service operation. The NF heart-beat service operation is a special case of the NF update service operation where an NF that is registered with the NRF periodically sends an NF heart-beat message to the NRF to update its status with the NRF. The NF heart-beat service operation is defined in Section 5.2.2.3.2 of 3GPP TS 29.510. According to the definition of the NF heart-beat service operation, each NF that has previously registered with the NRF shall contact the NRF periodically by invoking the NF update service operation in order to show that the NF is still operative. The time interval at which the NRF is contacted is deployment specific and it is returned by the NRF to the NF service consumer as a result of successful registration. The NF will heart-beat, i.e., transmit NF heart beat request messages and receive corresponding NF heart-beat response messages, with the NRF having the highest priority that is locally configured to provide service to the NF.

Figure 3:
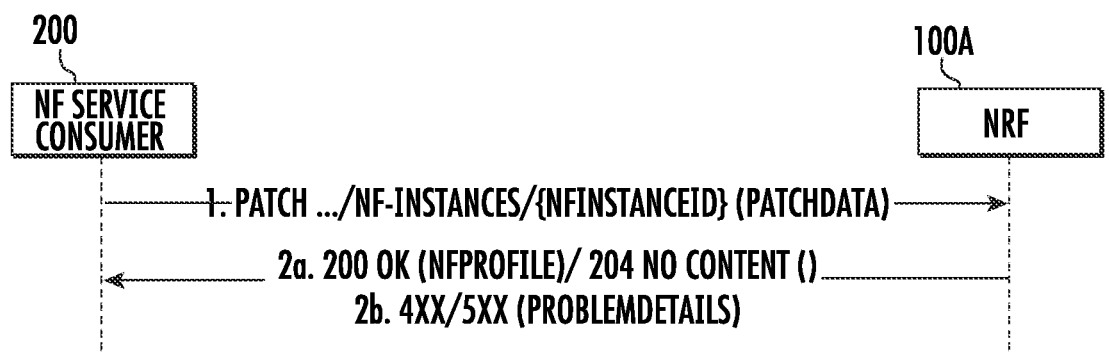
FIG. 3 is a message flow diagram illustrating exemplary messages exchanged for the NF heart-beat service operation.

FIG. 3 is a message flow diagram illustrating exemplary messages exchanged in the NF heart-beat service operation. Referring to FIG. 3, in step 1, NF service consumer 200 invokes the NF heart-beat service operation by sending an HTTP PATCH message to NRF 100A. NRF 100A responds to the HTTP PATCH message in step 2a with a 200 OK or a 204 No Content message if the NF heart-beat service operation is successful. In step 2b, NRF 100A responds with a 4xx or 5xx message if the NF heart-beat service operation is not successful.

Yet another service operation that is provided by the NRF is the NF discover service operation. The NF discover service operation is used to discover the set of NFs that are capable of providing a service to a given NF. The NF discover service operation is defined in Section 5.3.2.2 of 3GPP TS 29.510. According to the service definition, the NF discover service operation discovers the set of NF instances and their associated NF service instances represented by their NF profiles that are currently registered in the NRF and that satisfy input query parameters provided by the querying NF in the NF discover request.

Figure 4:
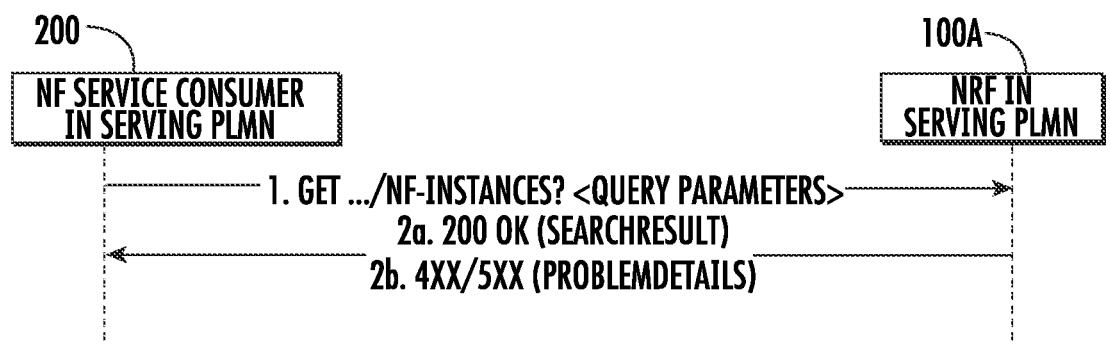
FIG. 4 is a message flow diagram illustrating exemplary messages exchanged for the NF discovery service operation.

FIG. 4 illustrates exemplary messages exchanged in the NF discover service operation. Referring to FIG. 4, and step 1, NF service consumer 200 initiates the NF discover service operation by sending an HTTP GET message to NRF 100A. The HTTP GET message includes query parameters used by NRF 100A to identify the set of NF profiles to return to NF service consumer 200. If the NF discover operation is successful, NRF 100A responds as indicated by step 2a with a 200 OK message including the NF profiles of NFs that match the query parameters in the NF discover request. If the NF discover service operation is unsuccessful, NRF 100A may respond with a 4xx or 5xx message specifying problem details, as indicated by step 2b.

Figure 5:
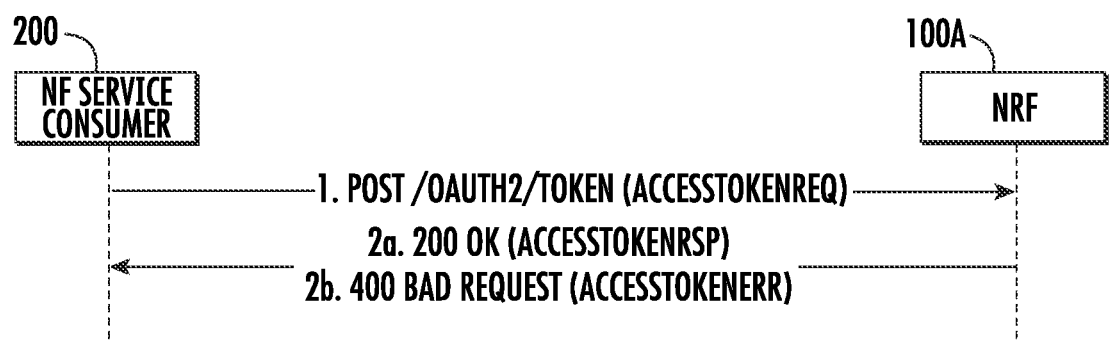
FIG. 5 is a message flow diagram illustrating exemplary messages exchanged for the NF access-token service operation.

Yet another service operation that may be provided by the NRF is the NF access-token service operation. The NF access-token service operation is used by the consumer NF to obtain an OAuth 2.0 access token usable to access a service provided by an NF service producer. The NF access-token service operation is defined in Section 5.4 of 3GPP TS 29.510. FIG. 5 is a message flow diagram illustrating exemplary messages exchanged in the NF access-token service operation. Referring to FIG. 5, in step 1, NF service consumer 200 initiates the NF access token service operation by sending an HTTP POST message to NRF 100A. The HTTP POST message identifies the service for which access is requested. If the access-token service operation is successful, NRF 100A responds with a 200 OK message including the OAuth 2.0 access token, as indicated by step 2a. If the NF access-token service operation is not successful, NRF 100A responds as indicated in step 2b with a 400 bad request message.

Figure 6:
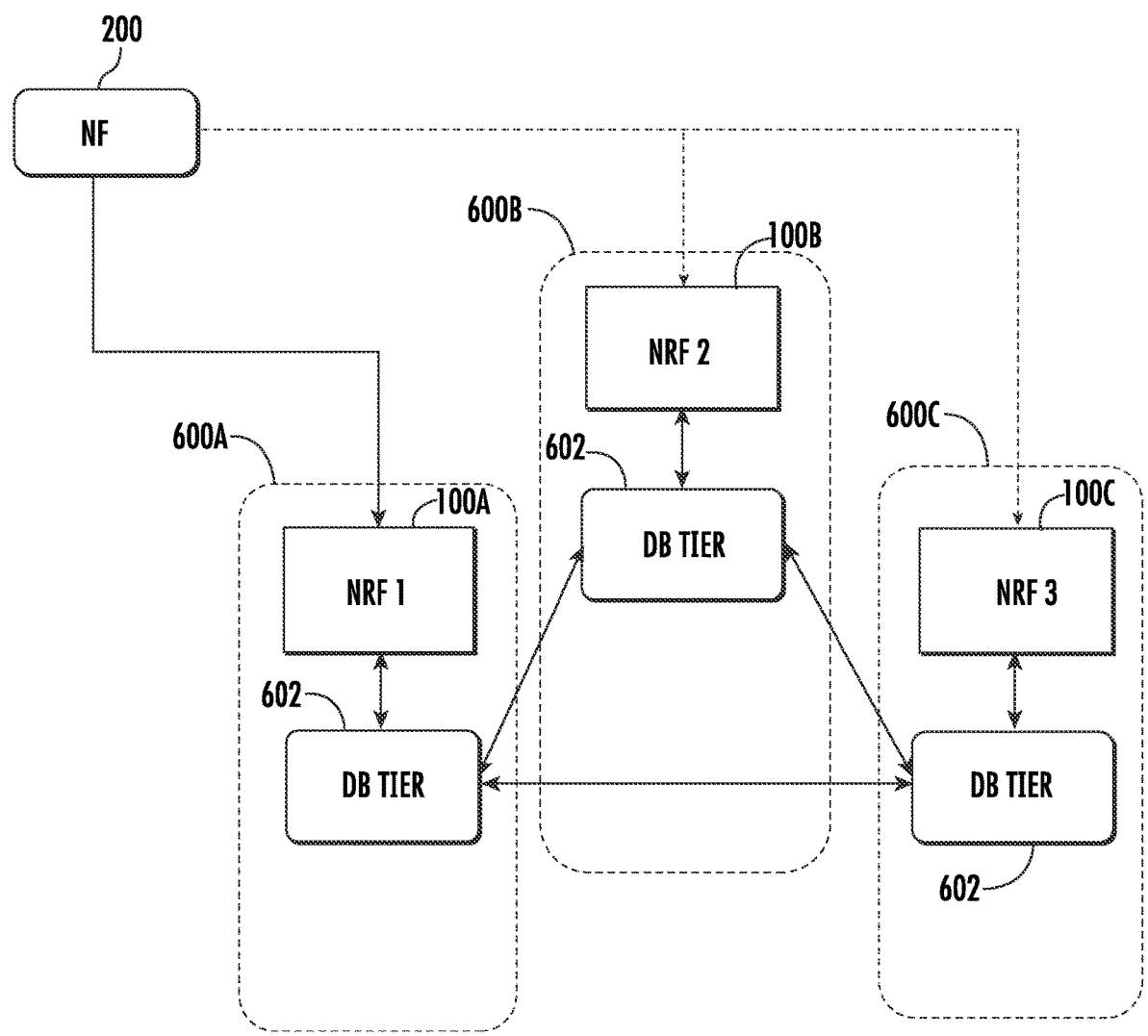
FIG. 6 is a network diagram illustrating and example of a geo-redundant NRF deployment.

As indicated above, some NRFs support geo-redundant deployments where NRFs that form a geo-redundant NRF set are deployed at different sites. FIG. 6 illustrates an example of a geo-redundant NRF deployment. In FIG. 6, NRFs 100A, 100B, and 100C are deployed at geographically diverse sites 600A, 600B, and 600C. Each NRF 100A, 100B, and 100C includes or has access to an NRF database 602. Each NRF database 602 includes NF profiles of NFs that are registered with any of the NRFs as well as consumer NF subscriptions to those profiles. If a record is created at any geo-redundant NRF site, then that record is replicated to and is accessible by the other NRFs located at the other sites. It should be noted that in FIG. 6 there are three geo-redundant NRFs. However, the subject matter described herein is applicable to any number of geo-redundant NRFs, including two NRFs or more than three NRFs.

Whether an NRF functions as a primary NRF for a given consumer NF may depend, in one example, on the location of the NRF with respect to the consumer NF. In the illustrated example, NRF 100A is closest to consumer NF 200. NRF 100B is the second closest NRF to consumer NF 200. NRF 100C is the furthest NRF from consumer NF 200. Accordingly, consumer NF 200 may be configured with NRF 100A as the primary NRF, NRF 100B as the secondary NRF, and NRF 100C as the tertiary NRF.

If NF 200 successfully registers with NRF 100A, and NRF 100A fails, NF 200 may attempt to obtain service from the next highest available NRF, which may be secondary NRF 100B, if NRF 100B is available. Consumer NF 200 may attempt to initiate communications with NRF 100B when NRF 100A fails by initiating NF heart-beat messages with NRF 100B. If NRF 100B is available, NRF 100B will respond to each of the NF heart-beat messages with a 200 OK message, as indicated in FIG. 3. Once a successful heart-beat exchange between NF 200 and NRF 100B occurs, NRF 100B will take ownership of the NF record of NF 200 to provide NF management, discovery, and access token services for that NF record.

Table 1 shown below illustrates exemplary NRF topology information that may be configured in memory of NF 200.

TABLE 1

Configured NRF Topology Information

| Priority | NRF ID |
|---|---|
| Primary | NRF1 |
| Secondary | NRF2 |
| Tertiary | NRF3 |

In Table 1, the example NRF topology information includes the identities of NRFs that are configured as geo-redundant mates that form an NRF set and relative priority information for the NRFs. NF 200 may use the priority information to select a next most preferred NRF when an NRF with which NF 200 is currently communicating fails. NF 200 may also use the priority information to select an NF to fall back to when an NRF of higher priority than the NRF with which NF 200 is currently communicating recovers.

As per 3GPP specifications, discovery of an NRF is based on static local configuration at the NF. For high availability, an NF can be configured with multiple geo-redundant NRFs with priority based on locality, as indicated in Table 1. For example, as indicated in Table 1, if there are three geo-redundant NRFs in a deployment, then the NF may be configured with primary, secondary, and tertiary NRFs, with the primary NRF being the NRF that is geographically closest to the NF. During initial NRF communications, i.e., registration, the NF will always try to connect to the highest priority NRF that is available.

Figure 7:
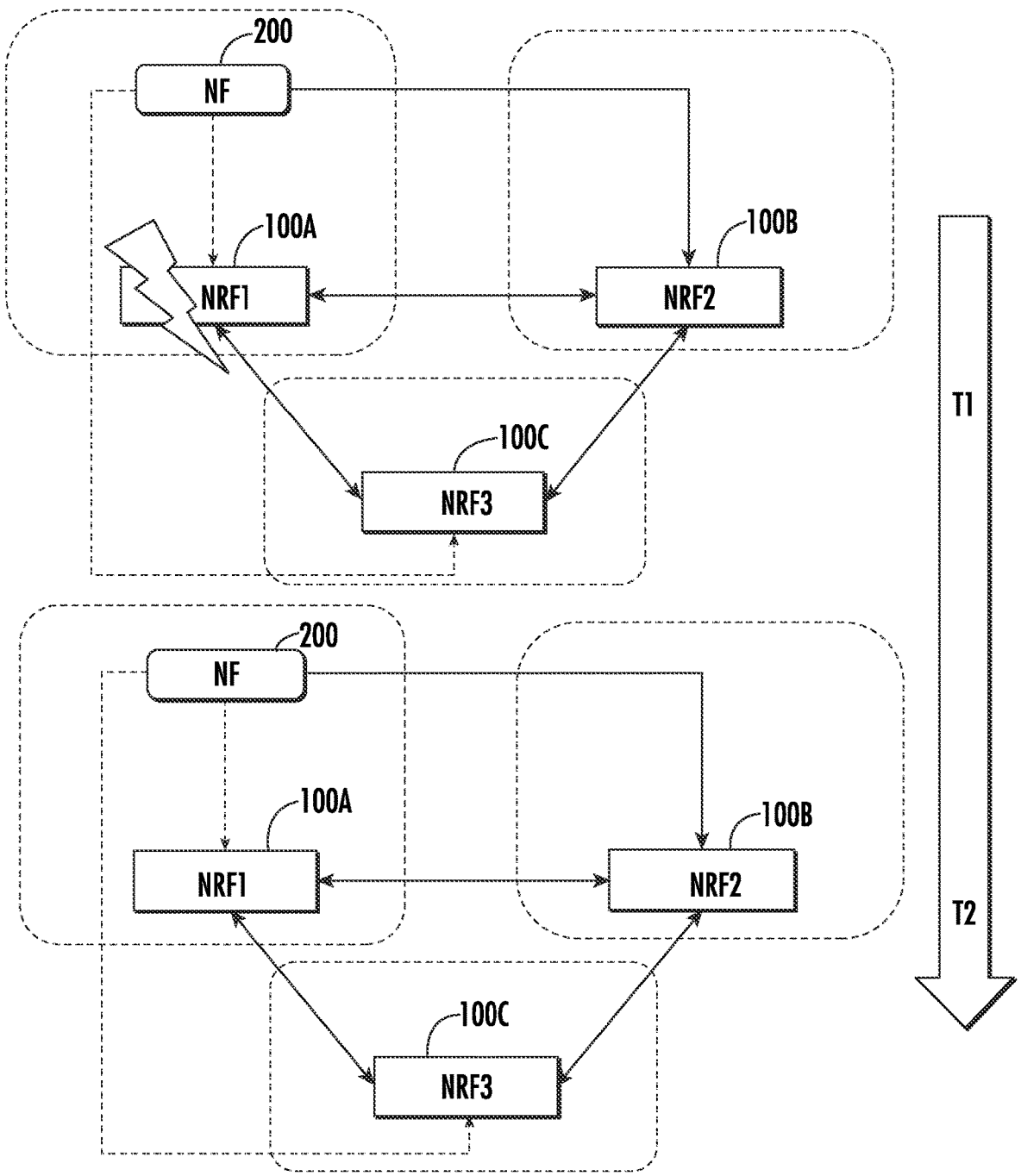
FIG. 7 is a network diagram illustrating and example of a geo-redundant NRF deployment where one of the NRFs fails.

FIG. 7 illustrates a problem that can occur when a primary NRF to which an NF is initially registered fails and then recovers. Referring to FIG. 7, it is assumed that NF 200 is initially connected to NRF 100A which is the primary NRF. Accordingly, using the configuration example in Table 1, NF 200 begins communicating with secondary NRF 1008. At time T2, primary NRF 100A recovers. However, there is no 3GPP standardized method to notify NF 200 that primary NRF 100A has recovered and that NF 200 should fall back to communicating with primary NRF 100A. Such a configuration is inefficient with regard to resource management, because NF 200 will continue communicating with secondary NRF 1008, which is geographically farther away from NF 200 than primary NRF 100A.

Figure 8:
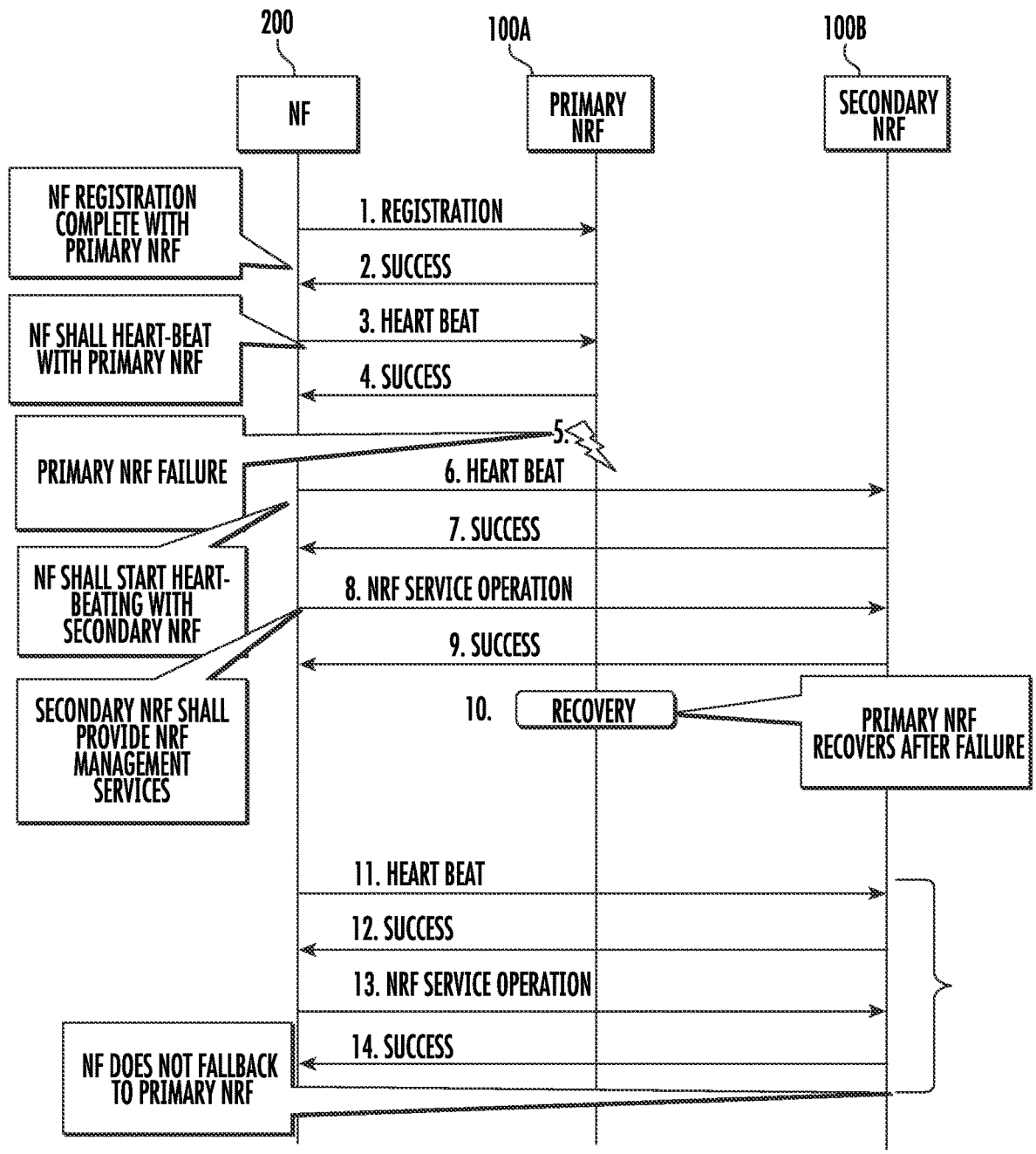
FIG. 8 is a message flow diagram illustrating exemplary messages exchanged when a failed NRF recovers, and the NF previously communicating with the recovered NRF is unable to fall back to communicating with the recovered NRF.

FIG. 8 illustrates the message flow diagram corresponding to the scenario illustrated in FIG. 7. Referring to the message flow in FIG. 8, in step 1, NF 200 registers with primary NRF 100A. In step 2, primary NRF 100A responds with a 201 Created message indicating that the registration was successful.

After registering with primary NRF 100A, NF 200 begins sending heart-beat messages to primary NRF 100A, as indicated by step 3. In step 4, primary NRF 100A responds to the NF heart-beat message in step 3 with a 200 OK message or a 204 No Content message indicating successful completion of the NF heart-beat operation.

In step 5, primary NRF 100A fails. NF 200 may detect the failure based on the lack of a response from primary NRF 100A to an NF heart-beat or other NF service operation message. In step 6, NF 200 begins heart-beating with secondary NRF 1008. In step 7, secondary NRF 1008 responds to the NF heart-beat request with a 200 OK or 204 No Content message.

In step 8, NF 200 initiates an NF service operation with secondary NRF 1008. In step 9, secondary NRF 1008 responds to the NF heart-beat message with a 200 OK or 204 No Content message.

In step 10, primary NRF 100A recovers. However, NF 200 is not aware of the recovery. Accordingly, NF 200 continues heart-beating with secondary NRF 1008, as indicated by steps 11 and 12, and initiating NRF service operations with secondary NRF 1008, as indicated by steps 13 and 14. Steps 11 through 14 illustrate the inefficiency of this situation because there is no way for NF 200 to know of the recovery of primary NRF 100A or to fall back to communicating with primary NRF 100A.

Figure 9:
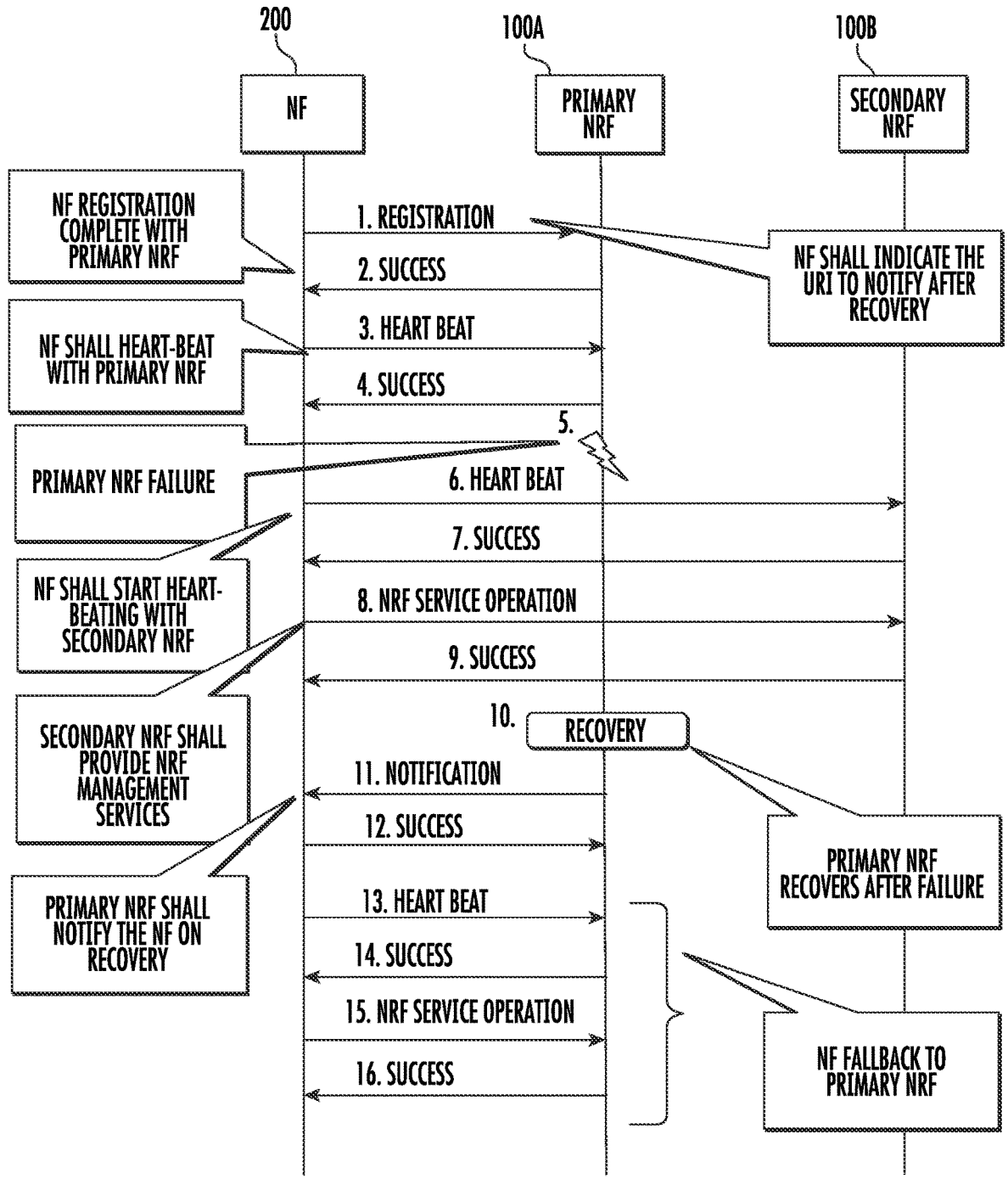
FIG. 9 is a message flow diagram illustrating exemplary messages exchanged when a failed NRF recovers, and the NF previously communicating with the recovered NRF is able to fall back to communicating with the recovered NRF.

In order to avoid the difficulty illustrated in FIGS. 7 and 8, the subject matter described herein includes modifications to registering NFs and NRFs to provide for notification of recovery of an NRF and for the NF to fall back to communicating with an NRF that is more preferred then the NRF with which the NF is currently communicating. FIG. 9 is a message flow diagram illustrating exemplary messages exchanged in providing for falling back to communications with a recovered NRF. Referring to FIG. 9, in step 1, NF 200 sends a registration message to primary NRF 100A. The registration message includes an indication that NRF 100A is to notify NF 200 upon recovery of NRF 100A after a failure of NRF 100A. The indication, in one example may be included as a parameter in a notify-on-recovery header of the NF register message. In another example, the indication to notify NF 200 on recovery of NRF 100A may be stored in a new information element (IE) in the NF profile of NF 200 included in the NF register message. In response to receiving the NF profile or header containing the indication to notify NF 200 of recovery of primary NRF 100A, NRF 100A stores the indication, either in the NF profile or other database record for NF 200 so that when primary NRF 100A recovers, primary NRF 100A will notify NF 200 of the recovery. In one example, the indication may be a uniform resource indicator (URI) that identifies or that is associated with NF 200. In step 2, NRF 100A responds to the NF register message with a success message indicating successful completion of the NF register operation.

After registering with primary NRF 100A, NF 200 begins sending heart-beat messages to primary NRF 100A, as indicated by step 3. In step 4, primary NRF 100A responds to the NF heart-beat message in step 3 with a 200 OK message or a 204 No Content message indicating successful completion of the NF heart-beat operation.

In step 5, primary NRF 100A fails. NF 200 may detect the failure based on the lack of a response from primary NRF 100A to an NF heart-beat or other NF service operation message. In step 6, NF 200 begins heart-beating with secondary NRF 2 1008. In step 7, secondary NRF 1008 responds to the NF heart-beat request with a 200 OK or 204 No Content message.

In step 8, NF 200 initiates an NF service operation with secondary NRF 1008. In step 9, secondary NRF 1008 responds to the NF heart-beat message with a 200 OK or 204 No Content message.

In step 10, primary NRF 100A recovers. In step 11, primary NRF sends a recovery notification message to NF 200 notifying NF 200 of the recovery of primary NRF 100A. In step 12, NF 200 responds to the recovery notification with a success message.

In step 13, NF 200 falls back to communicating with primary NRF 100A by sending an NF heart-beat request message to NRF 100A. In line 14, primary NRF 100A response to the NF heart-beat request message with a success message indicating successful completion of the NF heart-beat service operation. In step 15, consumer NF initiates an NRF service operation by sending a service based interface (SBI) request to primary NRF 100A. Primary NRF 100A responds in step 16 with a success message indicating successful completion of the NRF service operation. Thus, the steps illustrated in FIG. 9 enable an NF (consumer or producer) to fall back to communications with a more preferred NRF than the NRF with which the NF is currently communicating. Enabling such fall back capabilities avoids the difficulty illustrated in FIGS. 7 and 8 where the NF continues communicating with a less preferred NRF even when a more preferred NRF recovers.

Figure 10:
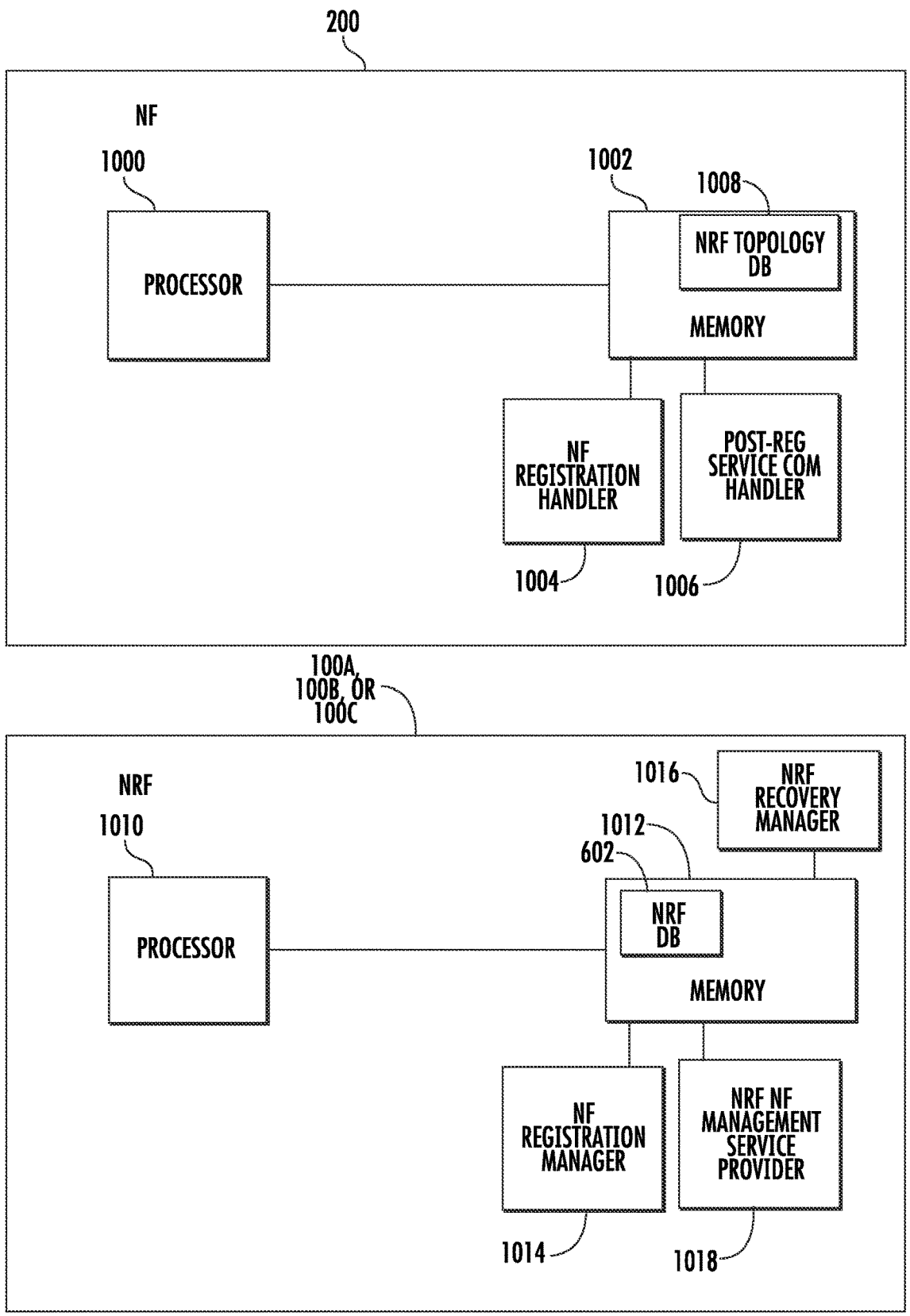
FIG. 10 is a block diagram illustrating architectures for an NF and an NRF that provide for falling back to communicating with the NRF after recovery of the NRF.

FIG. 10 is a block diagram illustrating exemplary internal architectures for NF 200 and NRF 100A, 1008, or 100C for providing for falling back to communications with a recovered NRF. Referring to FIG. 10, NF 200 includes at least one processor 1000 and memory 1002. NF 200 may be any of the NFs illustrated in FIG. 1. NF 200 further includes an NF registration handler 1004 and a post-registration service communications handler 1006, both of which may be implemented using computer-executable instructions stored in memory 1002 and executed by processor 1000. NF 200 may also include an NRF topology database 1008 stored in memory 1002. NRF topology database 1008 may store NRF identity and priority information, an example of which is illustrated above in Table 1.

NF registration handler 1004 may send NF register messages to NRF 100A, 1008, or 100C to register the NF profile of NF 200 with NRF 100A, 1008, or 100C. NF registration handler 1004 may include in the NF register messages, an indication to notify NF 200 of recovery of the NRF. As an example, suppose NF 200 initially registers with NRF 100A, which subsequently fails. As part of the registration with NRF 100A, NF 200 may request to be notified of recovery of NRF 100A.

Post-registration service communications handler 1006 may communicate initially with NRF 100A and detect failure of NRF 100A. In response to detecting failure of NRF 100A, post-registration service communications handler 1006 may begin heart-beating with NRF 1008. While communicating with NRF 1008, post-registration service communications handler 1006 may receive notification of recovery of NRF 100A and fall back to communicating with NRF 100A. Falling back to communicating with NRF 100A may include sending NF heart-beat messages and SBI service requests to NRF 100A.

The same fallback procedure described in the preceding paragraph can be used by NF 200 to fall back from communicating with NRF 100C to NRF 1008. In addition, although three NRFs are illustrated in the examples in FIG. 7, the methodology described herein supports falling back to communicating with an NRF of higher priority than the current NF in a hierarchy with any number of NRFs, including two NRFs or more than three NRFs. In addition, in one implementation, the NF may fall back to the highest priority available NRF of which the NF receives notification of recovery. For example, in a hierarchy of three NRFs, where the NF is currently communicating with the tertiary NRF, the NF may fall back to communicating with the secondary NRF, if the NF receives notification of recovery of the secondary NRF or with the primary NRF, if the NF receives notification of recovery of the primary NRF.

NRF 100A, 1008, or 100C includes at least one processor 1010 and memory 1012. NRF 100A, 1008, or 100C further includes an NF registration manager 1014, an NRF recovery manager 1016, and an NRF NF management service provider 1018. NF registration manager 1014 receives, from NFs, NF register messages (requests), where the requests can include the indication to notify the NFs of recovery of the NRF and store the indication in registration records and/or NF profiles for the NFs. The NF registration records and/or NF profiles are maintained in NRF database 602, which may be stored in memory 1012. NRF recovery manager 1016 may, in response to recovery of the NRF after a failure of the NRF, access the NF registration records for the NFs in database 602, read the indications to notify the NFs of the recovery, and generate and send notification messages to the NFs indicating recovery of the NRF. NRF NF management service provider 1018 may provide NRF NF management services to the NFs in response to NRF NF management service requests from the NFs. For example, NRF NF management service provider 1018 may respond to NF heart-beat requests, NF access-token requests, or other NRF NF management service requests received from other NFs. NF registration manager 1014, NRF recovery manager 1016, and an NRF NF management service provider 1018 may be implemented using computer-executable instructions stored in memory 1012 and executed by processor 1010.

Figure 11:
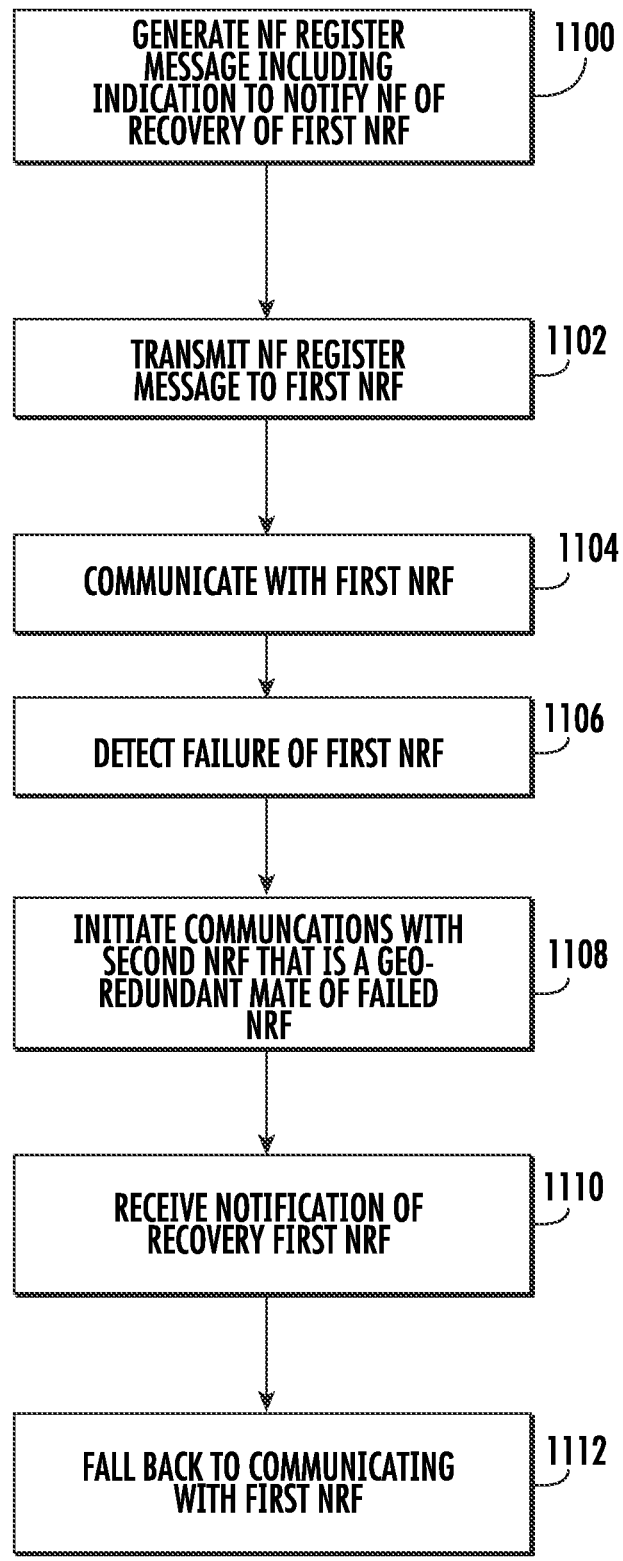
FIG. 11 is a flow chart illustrating an exemplary process performed by an NRF that provides for falling back to communicating with the NRF after recovery of the NRF.

FIG. 11 is a flow chart illustrating an exemplary process performed by an NF that provides for falling back to communicate with the NRF after recovery of the NRF. Referring to FIG. 11, the process includes steps performed at an NF, such as NF 200 described above. In step 1100, the process includes generating an NF register message including an indication to notify the NF of recovery of a first NRF after a failure of the first NRF. Here, "first NRF" is used to describe the NRF to which the NF is about to send the NF register message. The indication to notify the NF of recovery of the NRF is not NRF specific, meaning that the same formatted indication may be recognized by any NRF to generate a notification message to the requesting NF after recovery of the NRF. In one example, the indication to notify the NF of recovery of the first NRF may be included in a new header of the NF register message. In another example, the indication to notify the NF of recovery of the first NRF may be included in a new information element (IE) in the NF register message. The IE may, in one example, be a component of the NF profile of the NF.

In step 1102, the process includes transmitting the NF register message to a first NRF. For example, NF 200 may send an NF register message to one of NRFs 100A, 1008, and 100C, depending on which NF is most preferred to NF 200 based on operator configured priorities based on criteria, such as nearest locality to the NF or lowest latency communications with the NF.

In step 1104, the process includes communicating with the first NRF. For example, assuming the registration was successful, NF 200 may send SBI request messages to the NRF 100A, 1008, or 100C with which NF 200 is registered. Examples of the SBI request messages that may be sent include NF heart-beat requests, NFUpdate requests, NF access-token requests, etc. The NRF 100A, 1008, or 100C that receives the registration replicates the NF registration and the state of processing of any SBI requests to its geo-redundant mate NRFs so that any of NRFs 100A, 1008, or 100C can take over when another of the NRFs 100A, 1008, or 100C fails.

In step 1106, the process includes detecting failure of the first NRF. For example, NF 200 may detect failure of the NRF with which NF 200 is currently communicating by transmitting an SBI request to the NRF and failing to receive a response to the SBI request prior to expiration of a response timer started by NF 200 upon transmission of the SBI request.

In step 1108, the process includes, in response to detecting failure of the first NRF, initiating communications with an NRF that is a geo-redundant mate of the first NRF. For example, if NF 200 detects that the NRF with which NF 200 is currently communicating fails, NF 200 may initiate communications with the next most preferred NRF from the perspective of NF 200 based on its configuration. Initiating communications with the next most preferred NRF may include sending NF heart-beat messages to the next most preferred NRF.

In step 1110, the process includes receiving notification of recovery of the first NRF. For example, if the first NRF is NRF 100A, when NRF 100A recovers, NRF 100A will notify all NFs registered to receive notification of recovery of NRF 100A by transmitting recovery notification messages to the NFs.

In step 1112, the process includes falling back to communicating with the first NRF. For example, NF 200 may fall back from communicating with the current NRF to communicating with the newly recovered NRF in response to receiving notification that the NRF has recovered. Falling back to communicating with the newly recovered NRF may initially include sending NF heart-beat messages to the NRF, followed by sending SBI request messages to the NRF.

Figure 12:
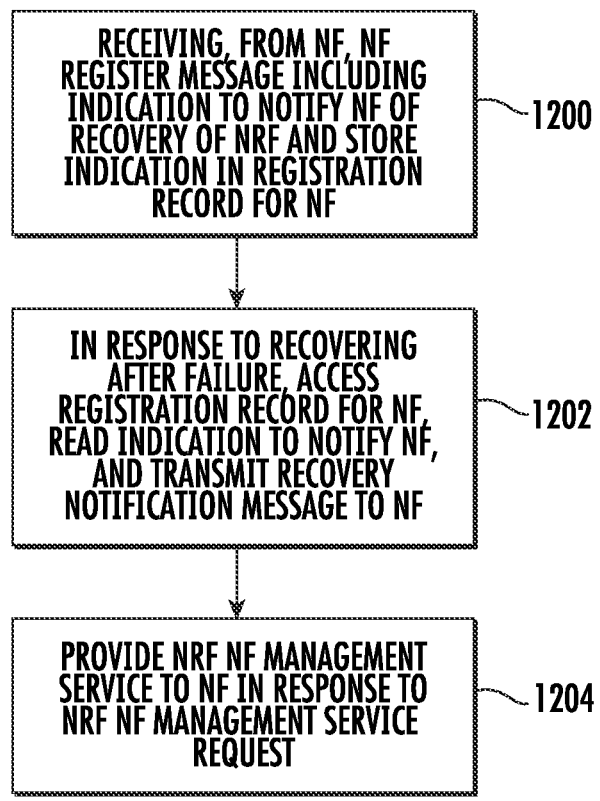
FIG. 12 is a flow chart illustrating an exemplary process performed by an NF that provides for falling back to communicating with an NRF after recovery of the NRF.

FIG. 12 is a flow chart illustrating an exemplary process performed by an NRF that provides for falling back to communicating with the NRF after recovery of the NRF. Referring to FIG. 12, the process includes steps performed at an NRF including at least one processor. In step 1200, the process includes receiving, from an NF, an NF register message including an indication to notify the NF of recovery of the NRF after a failure of the NRF and storing the indication in an NF registration record for the NF. For example, NRF 100A, 100B, or 100C may receive an NF register message with an indication to notify the registering NF of recovery of the NRF.

In step 1202, the process includes, in response to recovery of the NRF after a failure of the NRF, accessing the NF registration record for the NF, reading the indication to notify the NF, and generating and sending a notification message to the NF indicating recovery of the NRF. For example, NRF 100A, 100B, or 100C may recover, read the registration records in its NRF database, and transmit recovery notification messages to any NFs that registered to be notified of recovery of the NRF. The recovery notification messages, in one example, may be NOTIFY messages that include the identity of the recovered NRF.

In step 1204, the process includes providing NRF NF management service to the NF in response to an NRF NF management service request from the NF. For example, NRF 100A, 100B, and 100C may provide NRF NF management service to requesting NFs by responding to SBI requests from the requesting NFs.

Benefits of the subject matter described herein include the ability of an NF to fall back to communicating preferred NRF, which may reduce network resource usage and latency. Providing the ability to fall back to communicating with a recovered NRF may also load balance NRF traffic across NRF set more evenly than if the ability to fall back not available. Another benefit is that NFs are able learn the status of all the geo-redundant NRFs and dynamically maintain a real time NRF health map. For example, NF 200 may maintain, in its NRF topology database, in addition to the data illustrated in Table 1, a health status indicator for each NRF that indicates whether each NRF is available or not available for failover and fallback communications.

The disclosure of each of the following references is hereby incorporated herein by reference in its entirety.

REFERENCES 1. 3rd Generation Partnership Project; Technical Specification Group Core Network and Terminals; 5G System; Technical Realization of Service Based Architecture; Stage 3 (Release 17) 3GPP TS 29.500 V17.2.0 (2021-03).
2. 3rd Generation Partnership Project; Technical Specification Group Services and System Aspects; System architecture for the 5G System (5GS); Stage 2 (Release 17) 3GPP TS 23.501 V17.0.0 (2021-03).
3. 3rd Generation Partnership Project; Technical Specification Group Core Network and Terminals; 5G System; Network Function Repository Services; Stage 3 (Release 17) 3GPP TS 29.510 V17.1.0 (2021-03).
4. 3rd Generation Partnership Project; Technical Specification Group Services and System Aspects; Procedures for the 5G System (5GS); Stage 2 (Release 17) 3GPP TS 23.502 V17.0.0 (2021-03).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing for network function (NF) fallback to a recovered network function NF repository function (NRF), the method comprising:
   at an NF including at least one processor:
      generating an NF register message including an indication to notify the NF of recovery of a first NRF after failure of the first NRF;
      sending the NF register message to a first NRF;
      communicating with the first NRF;
      detecting failure of the first NRF;
      in response to detecting failure of the first NRF, initiating communications with a second NRF that is a geo-redundant mate of the first NRF;
      receiving, from the first NRF and in response to the first NRF reading an NF registration record including the indication to notify the NF of recovery of the first NRF and created by the first NRF in response to the NF register message including the indication to notify the NF of recovery of the first NRF after failure of the first NRF, a notification message notifying the NF of recovery of the first NRF and including an identity of the first NRF; and
      in response to receiving the notification message indicating recovery of the first NRF, ceasing communications with a second NRF and falling back to communicating with the first NRF by re-initiating NF heart-beat messaging with the first NRF.

2. The method of claim 1 wherein the indication to notify the NF of recovery of the first NRF after failure of the first NRF includes a notify-on-recovery header populated with a parameter associated with the NF.

3. The method of claim 2 wherein the parameter identifying the NF comprises a uniform resource identifier (URI) associated with the NF.

4. The method of claim 1 wherein the indication to notify the NF of recovery of the first NRF after failure of the first NRF includes a notify-on-recovery information element (IE) populated with a parameter associated with the NF.

5. The method of claim 4 wherein the parameter associated with the NF comprises a uniform resource identifier (URI) associated with the NF.

6. The method of claim 1 comprising, at the NF, maintaining a database including records corresponding to the first NRF and geo-redundant mates of the first NRF, where the records indicate relative priorities of the first NRF and the geo-redundant mates of the first NRF.

7. The method of claim 6 comprising, prior to initiating the communications with the second NRF, selecting the second NRF from the database based on a priority of the second NRF.

8. The method of claim 1 wherein receiving the notification message notifying the NF of recovery of the first NRF includes receiving a NOTIFY message with an NF status parameter indicating recovery of the first NRF.

9. The method of claim 1 wherein falling back to communicating with the first NRF includes initiating at least one NRF NF management service operation with the first NRF.

10. The method of claim 1 wherein the NF comprises a consumer NF or a producer NF.

11. A method for providing for fallback to a recovered network function (NF) repository function (NRF), the method comprising:
at a first NRF including at least one processor:
receiving, from an NF, an NF register message including an indication to notify the NF of recovery of the NRF after a failure of the NRF and storing the indication in an NF registration record for the NF;
in response to recovery of the NRF after a failure of the NRF, accessing the NF registration record for the NF, reading the indication to notify the NF, and generating and sending a notification message to the NF indicating recovery of the NRF and including an identity of the first NRF; and
providing NRF NF management service to the NF in response to an NRF NF management service request from the NF transmitted to the first NRF after the NF receives the notification message indicating recovery of the first NRF, ceases communications with a second NRF, and re-initiates NF heart-beat messaging with the first NRF.

12. A system for providing for network function (NF) fallback to a recovered network function NF repository function (NRF), the system comprising:
an NF including at least one processor;
an NF registration handler implemented by the at least one processor for generating an NF register message including an indication to notify the NF of recovery of a first NRF after a failure of the first NRF and transmitting the NF register message to the first NRF; and
a post-registration service communications handler implemented by the at least one processor for communicating with the first NRF, detecting failure of the first NRF, in response to detecting failure of the first NRF, initiating communications with a second NRF that is a geo-redundant mate of the first NRF, receiving, from the first NRF and in response to the first NRF reading an NF registration record including the indication to notify the NF of recovery of the first NRF and created by the first NRF in response to the NF register message including the indication to notify the NF of recovery of the first NRF after failure of the first NRF, a notification message indicating recovery of the first NRF and including the identity of the first NRF, ceasing communications with a second NRF, and falling back to communicating with the first NRF by re-initiating NF heart-beat messaging with the first NRF.

13. The system of claim 12 wherein the indication to notify the NF of recovery of the first NRF after failure of the first NRF comprises a notify-on-recovery header or information element (IE) populated with a uniform resource identifier (URI) associated with the NF.

14. The system of claim 12 comprising a database located at the NF and including records corresponding to the first NRF and geo-redundant mates of the first NRF, where the records indicate relative priorities of the first NRF and the geo-redundant mates of the first NRF.

15. The system of claim 14 wherein the post-registration service communications handler is configured to, prior to initiating communications with the second NRF, select the second NRF from the database based on a priority of the second NRF.

16. The system of claim 12 wherein the notification message indicating recovery of the first NRF comprises a NOTIFY message with an NF status parameters indicating recovery of the first NRF.

17. The system of claim 12 wherein the post-registration service communications handler is configured to fall back to communicating with the first NRF by initiating at least one NRF NF management service operation with the first NRF.

18. A system for providing for fallback to a recovered network function (NF) repository function (NRF), the system comprising:
a first NRF including at least one processor and a memory;
an NF registration manager implemented by the at least one processor for receiving, from an NF, an NF register message including an indication to notify the NF of recovery of the first NRF after a failure of the first NRF and storing the indication in an NF registration record for the NF;
an NRF recovery manager implemented by the at least one processor for, in response to recovery of the first NRF after a failure of the first NRF accessing the NF registration record for the NF, reading the indication to notify the NF, and generating and sending a notification message to the NF indicating recovery of the NRF and including an identity of the first NRF; and
an NRF NF management service provider implemented by the at least one processor for providing NRF NF management service to the NF in response to an NRF NF management service request from the NF transmitted to the first NRF after the NF receives the notification message indicating recovery of the first NRF, ceases communications with a second NRF, and re-initiates NF heart-beat messaging with the first NRF.

19. The system of claim 18 wherein the indication to notify the NF of recovery of the first NRF comprises a notify-on-recovery header or information element (IE) populated with a uniform resource identifier (URI) associated with the NF.

20. A non-transitory computer readable medium having stored thereon executable instructions that when executed by a processor of a computer control the computer to perform steps comprising:
at a network function (NF):
generating an NF register message including an indication to notify the NF of recovery of a first NF repository function (NRF) after a failure of the first NRF;
transmitting the NF register message to the first NRF;
communicating with the first NRF;
detecting failure of the first NRF;
in response to detecting failure of the first NRF, initiating communications with a second NRF that is a geo-redundant mate of the first NRF;
receiving, from the first NRF and in response to the first NRF reading an NF registration record including the indication to notify the NF of recovery of the first NRF and created by the first NRF in response to the NF register message including the indication to notify the NF of recovery of the first NRF after failure of the first NRF, a notification message notifying the NF of recovery of the first NRF and including an identity of the first NRF; and
in response to receiving the notification message indicating recovery of the first NRF, ceasing communications with a second NRF and falling back to communicating with the first NRF by re-initiating NF heart-beat messaging with the first NRF.

* * * * *